(12) United States Patent
Ress et al.

(10) Patent No.: US 7,715,537 B2
(45) Date of Patent: May 11, 2010

(54) METERING IN PACKET-BASED TELEPHONY NETWORKS

(75) Inventors: David P. Ress, Cary, NC (US); Kevin Boyle, II, Apex, NC (US); William Bishop, Raleigh, NC (US); Costin Strugaru, Immenstaad (DE)

(73) Assignee: Nortel Networks Limited, St. Laurent, Quebec (CA)

( * ) Notice: Subject to any disclaimer, the term of this patent is extended or adjusted under 35 U.S.C. 154(b) by 1568 days.

(21) Appl. No.: 10/742,324

(22) Filed: Dec. 19, 2003

(65) Prior Publication Data

US 2005/0135578 A1 Jun. 23, 2005

(51) Int. Cl.
 *H04M 15/00* (2006.01)
(52) U.S. Cl. .................................. 379/114.01; 379/124
(58) Field of Classification Search .................. 379/124, 379/106.03, 114.01
 See application file for complete search history.

(56) References Cited

U.S. PATENT DOCUMENTS

| | | | |
|---|---|---|---|
| 6,950,441 B1 * | 9/2005 | Kaczmarczyk et al. | ...... 370/467 |
| 6,985,446 B1 * | 1/2006 | Hurtta et al. | ................. 370/249 |
| 2001/0033583 A1 * | 10/2001 | Rabenko et al. | ............. 370/503 |
| 2003/0152039 A1 * | 8/2003 | Roberts | ....................... 370/255 |
| 2003/0154174 A1 * | 8/2003 | Tassel et al. | ................. 705/412 |

OTHER PUBLICATIONS

ETSI Standards, "Integrated Services Digital Network (ISDN); Signalling System No. 7 (SS7); ISDN User Part (ISUP); Signalling Aspect of Charging," European Telecommunications Standards Institute, Sophia-Antipo, France, vol. SP-1; SPAN-13, No. V131, Apr. 2003, XP014004338.
European search report for EP 04078379.7 mailed May 29, 2006.

* cited by examiner

*Primary Examiner*—Rasha S Al Aubaidi
(74) *Attorney, Agent, or Firm*—Withrow & Terranova, PLLC (57) ABSTRACT

One embodiment of the present invention facilitates efficient metering in a packet network environment by providing a single metering message, which contains sufficient information to provide the complete call tariff model for a particular call. The media gateway receiving the message can analyze the information provided in the message to determine how to provide metering pulses for all phases of the call, as well as any one-time charges, such as setup and add-on charges. Another embodiment of the invention provides a way for handling fractional pulse counts in an efficient manner. Yet another embodiment facilitates the handling of situations where charge intervals do not divide evenly into the phase duration of the phase associated with the call. In still another embodiment, the amount of information necessary to deliver the parameters of the call tariff model is minimized to reduce the overhead necessary for facilitating the metering process.

39 Claims, 5 Drawing Sheets

METERING IN PACKET-BASED TELEPHONY NETWORKS

FIELD OF THE INVENTION

The present invention relates to communications, and in particular to providing metering for communication services in a packet-based telephony network.

BACKGROUND OF THE INVENTION

Classic Time Division Multiplex (TDM)-based telephony switches allow service providers to provision tariff, or billing, information. These tariffs apply to any number of applications, such as local calls, long distance calls, operator-assisted calls, service calls, Integrated Services Digital Network (ISDN) calls, and other types of calls. Through a capability referred to as hardware metering, tariff information may be sent to a user's telephone or a device associated therewith, which processes the information to provide charge information to the user or help account for the call. For example, the information may be used to alert a pay phone that additional money is necessary to establish or continue the call. The tariff information is generally provided to the telephone or to an associated device as a series of pulses, which correspond to the tariff being incurred. The pulses are used to calculate the tariff and control how to process the call or control information provided to the user.

Generally, the call tariff models divide a call into a number of phases. Each phase represents a different tariff rate. The duration of a phase may be explicitly defined or may be infinite. An infinitely long phase duration means the tariff defined for the phase applies for the remainder of the call. The tariff itself is defined by a charge rate, expressed in an amount of currency per unit of time, for each phase and optionally a charge interval. The charge interval allows the provider to specify how frequently charges are assessed during the phase. Call tariff models may also include one-time charges, such as a call setup charge, or a mid-call add-on charge, which may be applied to charge for events, such as invocation of a supplementary feature during the call. In addition to the tariff rate information, the service provider must be able to specify the conversion rate for mapping currency charges-into pulse counts. The result of this conversion is referred to as a tariffed pulse rate (TPR).

Generally, the TPR is specified in units of pulses per second, and each phase has a specific TPR. In a traditional Public Switched Telephone Network (PSTN), these pulses are provided over a dedicated circuit-switched connection. As the PSTN is replaced by packet-based network architectures, this process of providing pulses in a metering process faces new challenges. Given the inherent nature of packet-based networks, errors in metering accuracy are exacerbated due to latency caused by routing equipment in the packet network, as well as the potentially greater distances over which metering information must be conveyed. Further, the potential for packet loss and the subsequent need for packet retransmission increases the likelihood of inaccuracy in the metering process.

Current metering processes in packet networks rely heavily on the use of different messages to handle different aspects of the call, such as the setup and add-on events, as well as each phase of the call. The messaging associated with the metering process impacts available bandwidth and processing resources. Further, the complexity of the metering process often requires an effective fractional pulse rate over a given phase. At this point, there is no effective mechanism for handling fractional pulse rates in a packet-based environment. Accordingly, there is a need for an efficient metering process in a packet environment that is capable of addressing one or more of the limitations set forth above.

SUMMARY OF THE INVENTION

The present invention facilitates efficient metering in a packet network environment by providing a single metering message, which contains sufficient information to provide the complete call tariff model for a particular call. The media gateway receiving the message can analyze the information provided in the message to determine how to provide metering pulses for all phases of the call, as well as any one-time charges, such as setup and add-on charges. The setup charges are associated with initiating the call and the add-on charges are other charges related to activating features during the call. One embodiment of the invention provides an efficient way for handling fractional pulse counts in an efficient manner. Another embodiment facilitates the handling of situations where charge intervals do not divide evenly into the phase durations of the phases associated with the call. In yet another embodiment, the amount of information necessary to deliver the parameters of the call tariff model is minimized to reduce the overhead necessary for facilitating the metering process.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides an effective and efficient technique for facilitating a metering process for a telephony endpoint, which is supported by a packet network via a media gateway. Metering is the process of applying signals, preferably in the form of pulses, over a telephone line to a telephony endpoint. The signals are received by the telephony endpoint or equipment associated therewith to provide information bearing on charges associated with the call. The information may be used to advise a user of the charges for the call, or to instruct the telephony endpoint or the device associated therewith to collect fees from the user or payment associated with a call. The charges associated with a call are generally referred to as a tariff, and the present invention allows a complete description of the tariff through the various phases of a call to be provided to the media gateway in a single message, wherein the media gateway can take the information in the message and provide all of the necessary pulses for the entire call. The pulses are provided as necessary for each phase of the call, as well as for any setup or additional charges incurred at the beginning of or during the call. Prior to delving into the details of the present invention, an overview of an exemplary communication environment 10, which incorporates the concepts of the present invention, is illustrated in FIG. 1.

The communication environment 10 is centered around a packet network 12 and a Public Switched Telephone Network (PSTN) 14, which support telephony communications between any number of telephony endpoints 16(A), 16(B), such as telephones or computing devices enabled to support telephony communications. When calls to or from the telephony endpoints 16(A), 16(B) require metering, metering may be facilitated by a separate metering device 18, which is associated with a standard telephony endpoint 16(A), or a more sophisticated telephony endpoint 16(B) may be configured to include a metering function 20. In either case, the metering device 18 or metering function 20 will operate to receive pulses from entities in the PSTN 14 or from a supporting media gateway (MG) 22, which facilitates communications over the packet network 12. The media gateway 22 supports telephony circuits, which connect directly to a telephony endpoint 16(B) or to a metering device 18, which supports a traditional telephony endpoint 16(A).

In traditional metering systems, the PSTN 14 will send metering pulses to the telephony endpoint 16(B) or metering device 18 over a dedicated, circuit-switched connection. In a packet environment, metering pulses are provided by the media gateway 22 to either the metering device 18 or the telephony endpoint 16(B). The present invention is directed to controlling the media gateway 22 to efficiently provide the metering pulses to the metering device 18 or the telephony endpoint 16(B).

Figure 1:
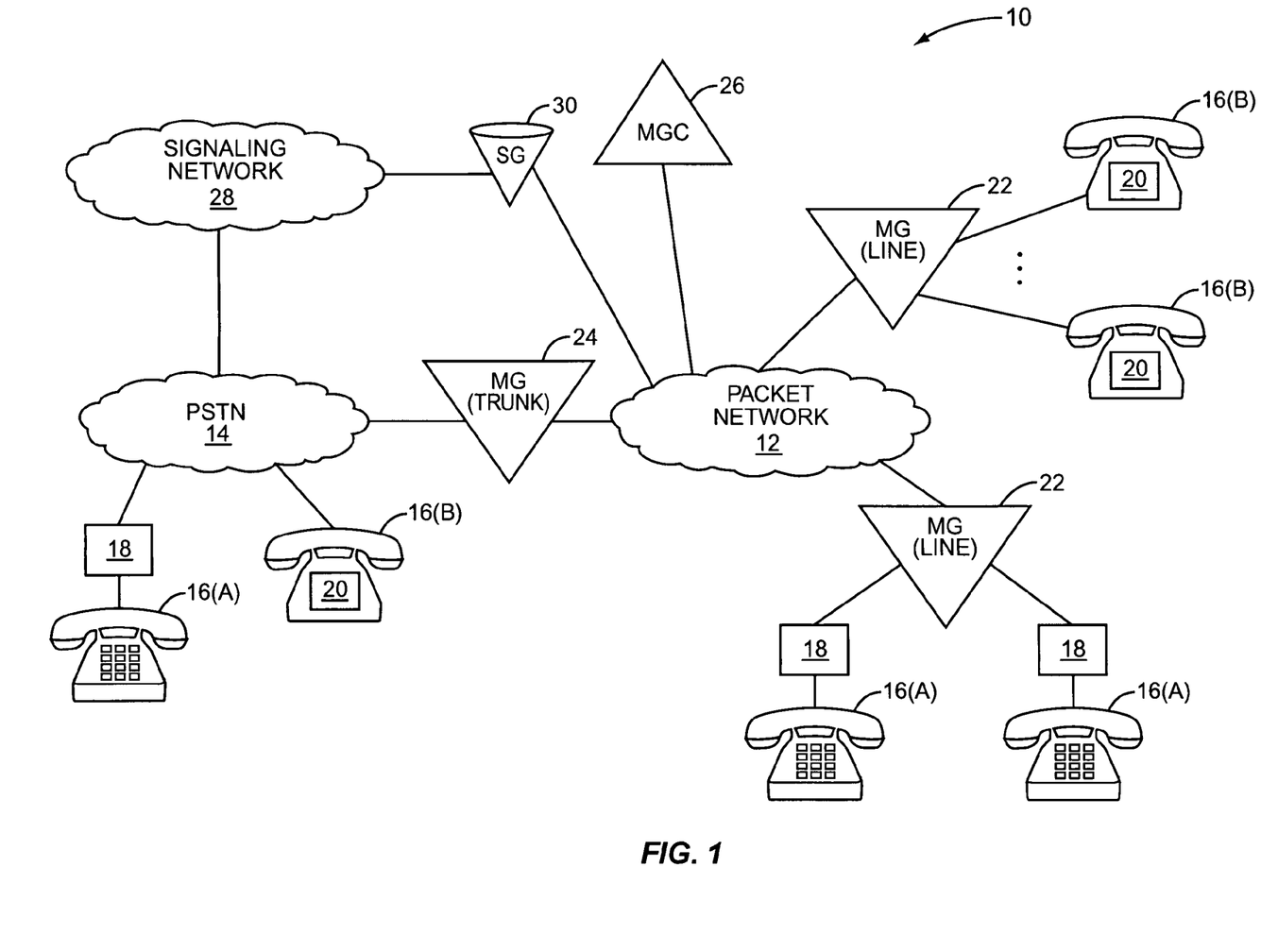
FIG. 1 is a block representation of a communication environment according to one embodiment of the present invention.

Continuing with FIG. 1, communications between the PSTN 14 and the packet network 12 are facilitated by a trunking media gateway 24, which will convert circuit-switched communications to packet-based communications, and vice versa, between trunks going to the PSTN 14 and the packet network 12. Control of the media gateways 22 and the trunking media gateway 24 is provided by a media gateway controller (MGC) 26, which will also play a role in the metering process. The media gateway controller 26 is essentially a session or call control entity, and may interact with other signaling entities on a signaling network 28, such as a Signaling Systems 7 (SS7) network, directly or indirectly via a signaling gateway (SG) 30 providing the necessary translations for call or session control signaling between the signaling network 28 and the media gateway controller 26.

As noted, to facilitate interworking of PSTN and packet communications, there are two primary elements: the media gateways 22, 24 and the media gateway controller 26. The media gateways 22, 24 provide the actual interface between the packet network 12 and the telephony endpoints 16(A), 16(B), directly or indirectly via the metering device 18, or provide translation in the trunks between the packet network 12 and the circuit-switched telephony switches in the PSTN 14, respectively. The lines connecting to the telephony endpoints 16(B) or the metering devices 18 may be traditional telephony lines and use traditional pulse code modulated or analog signaling to carry voice information therebetween, as well as to facilitate the provision of pulses for metering from the media gateways 22 to the metering devices 18 or the telephony endpoints 16(B). In turn, the media gateways 22 will facilitate corresponding packet sessions to other media gateways to enable a bidirectional communication session.

Figure 2:
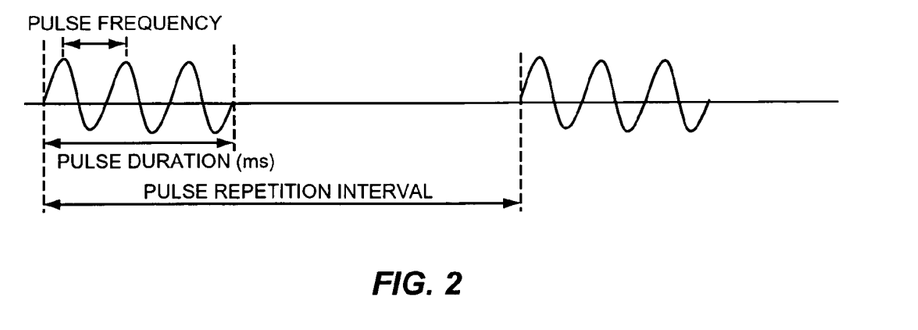
FIG. 2 illustrates an exemplary pulse configuration according to one embodiment of the present invention.

In operation, the media gateway controller 26, upon coordinating with the media gateway 22 to establish a call involving a telephony endpoint 16(A) or 16(B), will send a single metering message, which will provide sufficient information to the media gateway 22 supporting the particular telephony endpoint 16(A) or 16(B) to allow the media gateway 22 to provide the necessary metering throughout the call. Metering pulses are generally described with the following four characteristics:

pulse frequency, which is based on a peak-to-peak value of a sinusoidal signal and may typically have values between 12 KHz and 16 KHz;

pulse duration, which defines the period over which the sinusoidal signal is applied to represent a pulse;

pulse repetition interval (PRI), which defines an interval between the leading edge of a pulse to the leading edge of the next pulse; and pulse level, which defines the relative amplitude of the sinusoidal signal used to represent the pulse, wherein typical values are between 2 and 2.6 Volts root mean square (RMS).

These characteristics are illustrated in FIG. 2, which depicts two pulses having the same pulse duration and occurring over a pulse repetition interval at a given pulse frequency. Each pulse is uniform in pulse level, pulse duration, and pulse frequency in the illustrated embodiment.

Figure 3:
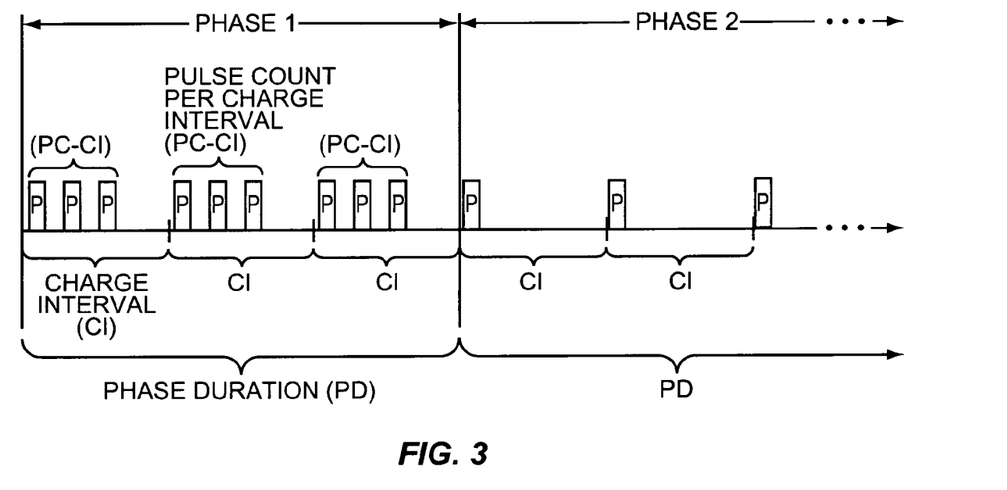
FIG. 3 illustrates multiple phases for a metering process according to one embodiment of the present invention.

Referring now to FIG. 3, a call may include multiple phases, which are associated with different tariff rates. The duration of a phase may be explicitly defined as a finite period, or it may be infinite. An infinitely long phase duration means the tariff for the phase will be constant for the remainder of the call. The tariff is generally defined by a charge rate, which may be based on currency per unit of time for a given phase or perhaps for a charge interval. The charge interval defines the frequency with which charges are assessed in accordance with the tariff rate. For example, the tariff rate may be ten cents per minute, wherein the charge interval is every six seconds. In this example, a charge of one cent is incurred every six seconds for a call. In addition, tariffs for a call may include one-time charges, such as a call setup charge for initiating a call, or an add-on charge, which may be applied midway through a call for invoking a supplementary feature. An example tariff rate data table is provided in Table 1.

TABLE 1

Example Tariff Rate Data Table

|  | Charge Rate ($/time unit) | Phase Duration (time unit) | Charge Interval (time unit) |
|---|---|---|---|
| Phase 1 | $1.00/min | 1 min | 6 sec |
| Phase 2 | $0.50/min | 5 min | 6 sec |
| Phase 3 | $0.25/min | 10 min | 6 sec |
| Phase 4 | $0.10/min | ∞ | 6 sec |

Since the tariff rates are implemented using pulses, there must be a conversion from a tariff rate to a pulse rate, wherein each pulse is associated with the tariff, such that the rate at which pulses are provided during the metering process corresponds to the tariff rates. The resultant pulse rate, which is based on the tariff rate, is referred to as a tariffed pulse rate (TPR). The TPR is generally specified in units of pulses per second, wherein each phase has a unique TPR.

With reference to FIG. 3, a metering model is illustrated. The depicted call includes two phases, Phase 1 and Phase 2, which have unique TPRs. Each phase will have a phase duration defining the length of the phase, if the phase is not infinite, which would indicate a given TPR will be applied for the remainder of the call. Select metering processes will define charge intervals, which again define the frequency with which charges are incurred. Based on the TPR, each charge interval will define a period in which a select number of pulses will occur, wherein the charge intervals and the pulses therein repeat throughout the phase. The number of pulses occurring during any charge interval is referred to as a pulse count per charge interval (PC-CI). When a new phase begins, the charge intervals, as well as the PC-CI, may change to reflect the TPR. In the illustrated example, each charge interval in Phase 1 has a PC-CI of three, wherein each charge interval in Phase 2 has a PC-CI of one.

Because the tariff rates may be complex and vary from one service provider to another for different types of services, the conversion of the tariff rates to pulse counts can produce non-integer values, such as 2.333 pulses per charge interval or phase. Since a fraction of a pulse cannot be signaled to the metering device 18 or the telephony endpoint 16(B), there is inherent inaccuracy in the metering process. Due to the sensitivity of billing matters to both the service provider and the subscriber or customer to be billed, one of the key challenges for a metering process is to be able to provide metering that is as accurate as possible. In addition to dealing with fractional pulse counts, another obstacle in the way of accurate metering is the messaging overhead, packet loss, and latency associated with transporting packets carrying metering instructions over the packet network 12 between the various media gateways 22, 24 as well as between the media gateway 22 and the media gateway controller 26. To address these concerns, one embodiment of the present invention provides a single message to the media gateway 22 from the media gateway controller 26 to provide all of the information necessary for the metering associated with a given call. Thus, the message will include, if necessary, parameters defining how to provide metering for each possible phase associated with a call, as well as setup and add-on charges. In essence, the entire (or complete) call tariff model is expressed in a single message, which is sent to the media gateway 22 in association with the call. An exemplary message including an entire call tariff model follows:

```
Message Header
TariffRate_SignalList={
    {Setup Charges},
    {Phase 1 Tariff Data, Phase 1 Duration}
    {Phase 2 Tariff Data, Phase 2 Duration}
    .
    .
    .
    {Phase N Tariff Data, Phase N Duration}
}
```

After the message header, the TariffRate_SignalList defines the call tariff model for the call. Initially, parameters for setup charges are defined, followed by parameters necessary for metering phases 1-N of the call. Notably, each phase will include a phase duration, in addition to any tariff data, which essentially defines the rate at which pulses are provided throughout the phase duration, in general or in defined charge intervals.

Setup and add-on charges may be handled in a multitude of ways within the call tariff model. In one embodiment, one-time charges for call setup may be applied using a burst of pulses provided at the beginning of the first phase, wherein pulses are provided at a maximum rate until the one-time charge is reached and any pulses required during the first phase during which the pulse burst occurs are provided. In essence, the pulse burst will recover the one-time charge and then catch up with the normal TPR for the phase. In the following call tariff model, the TariffRate_SignalList defines the setup charge parameters as requiring five pulses using a metering pulse burst (MPB) at a 3 millisecond pulse rate interval (PRI):

```
TariffRate_SignalList={
    {PRI=3, MPB=5}
    {Phase 1 Tariff Data, Phase 1 Duration}
    {Phase 2 Tariff Data, Phase 2 Duration}
    .
    .
    .
    {Phase N Tariff Data, Phase N Duration}
}
```

For add-on charges, which occur during the middle of the call, the call tariff model may be further modified to define the parameters for providing pulses for an add-on charge. In the following example, eight pulses are provided using a metering pulse burst, where the pulses are provided at three millisecond pulse rate intervals. The original call tariff descriptor may be included in the new message as a keep alive mechanism, which informs the media gateway 22 that it should continue to process that signal list rather than aborting and starting over:

```
{PRI=3, MPB=8}           %% Add-on Charge
TariffRate_SignalList={  %% Keep alive original call tariff descriptor
    {PRI=3, MPB=5}
```

-continued

```
{Phase 1 Tariff Data, Phase 1 Duration}
{Phase 2 Tariff Data, Phase 2 Duration}
.
.
.
{Phase N Tariff Data, Phase N Duration}
}
```

Notably, the above call tariff model still defines the call setup charges as previously defined, wherein five pulses are provided at three millisecond intervals. When the add-on charges occur, the media gateway 22 will provide the burst of pulses for the add-on charge as well as any additional pulses necessary for the TPR normally associated with the given phase.

In an alternative to intermingling the normal pulses associated with the TPR and any one-time charges such as setup and add-on charges, virtual phases may be defined to accommodate the pulses associated with one-time charges. These virtual phases are generically referred to as pulse windows, and may correspond directly to a regular phase, or may be a portion of a regular phase. The following call tariff model, as embodied in a TariffRate_SignalList, follows wherein the first regular phase is divided into two pulse windows. The first pulse window defines the parameters necessary to provide pulses associated with setup charges and some of the pulses necessary for Phase 1, and the second pulse window defines the regular pulses based on the TPR for the first regular phase that are necessary for the balance of Phase 1. Notably, the first pulse window has a corresponding pulse window duration, and the second pulse window is the balance of the duration for the first regular phase. The remaining pulse windows correspond directly to the remaining regular phases of the call. The TarrifRate_SignalList is as follows:

```
TariffRate_SignalList={
    {Pulse Window 1 Data (Setup Charges + Some of Phase
      1), Pulse Window 1 Duration}
    {Pulse Window 2 Data (Balance of Phase 1 Pulse Rate),
      Balance of Phase 1 Duration}
    {Pulse Window 3 Data (Phase 2 Tariff Data, Phase 2
      Duration)}
    .
    .
    .
    {Pulse Window N+1 Data (Phase N Tariff Data, Phase N
      Duration)}
}
```

Add-on charges are handled in a similar fashion.

As noted, handling fractional tariff pulse rates may require a fractional pulse count throughout a defined charge interval or phase. In one embodiment of the present invention, the fractional pulse count is converted into discrete integer components, which describe how many actual pulses to provide during consecutive charge intervals to approximate the desired fractional pulse count over a period of time. In essence, the pulse count per charge interval may vary from one charge interval to another to approximate the fractional tariff pulse rate over a series of charge intervals. For example, if a phase consisting of 10 charge intervals has a PC-CI of 2.333 pulses per second (pps), then a pattern of applying 3 pps and 2 pps across the 10 intervals can yield a very accurate approximation of 2.333 pps.

As implied in the previous example, the integer values used as pulse counts in successive charge intervals are simply the truncated and rounded values of the PC-CI value. These are referred to respectively as PC-CImin and PC-CImax. Considering once again the example from above with a phase of 10 charge intervals and a PC-CI of 2.333 pps, PC-CImin=2 and PC-CImax=3 can be applied across the 10 charge intervals as follows:

CI1: 3 pps (PC-CImax)
CI2: 2 pps (PC-CImin)
CI3: 2 pps
CI4: 3 pps
CI5: 2 pps
CI6: 2 pps
CI7: 3 pps
CI8: 2 pps
CI9: 2 pps
CI10: 2 pps This results in 23 applied pulses across the phase which is a very accurate representation of 2.333 pps times 10 charge intervals. This pattern of applying pulses can be represented by a pulse map as follows:

{3 2 2 3 2 2 3 2 2 2}.

Since the number of charge intervals could in theory be much greater than 10, a simplified shorthand expression is desired for representing the pulse map. This expression is of the form:

{PC-CImax, PC-CImaxrep} {PC-CImin, PC-CIminrep}, where PC-CImax and PC-CImin are as described above and PC-CImaxrep and PC-CIminrep represent the number of occurrences of PC-CImax and PC-CImin respectively that appear in the pulse map. The pulse map illustrated above is represented in this format as:

{3 3} {2 7}.

While this format concisely describes the number of instances of PC-CImax and PC-CImin to be applied across the phase, it does not describe the interleaving pattern required. Consequently, a number of viable pattern permutations exist. Three general patterns are discussed briefly.

The first pattern, max loading, places the PC-CImax values at the front of the pattern. This pattern eliminates the possibility of under-pulsing on calls which end during the middle of the phase. Conversely however, it may result in over-pulsing, particularly in cases where the fraction is less than or equal to 0.5. Due to this tendency to overpulse as opposed to underpulse, this model works more to the benefit of the service provider than the subscriber. Using the max loading pattern, the previous example is expressed as follows:

{3, 3, 3, 2, 2, 2, 2, 2, 2, 2}.

The second pattern, min loading, places the PC-CImin values at the front of the pattern. As the max loading pattern tends to overpulse, the min loading pattern tends to underpulse, thereby benefiting the subscriber at the expense of the service provider. Using the min loading pattern, the previous example is expressed as follows:

{2, 2, 2, 2, 2, 2, 2, 3, 3, 3}.

A third pattern, weighted interleaving, interleaves the PC-CImax and PC-CImin values in such a way that the most accurate pulse count is achieved regardless as to what point in the phase the call ends. The algorithm for creating the most optimal pulse map pattern is a function of the number of elements in the pulse map and the fractional part of the PC-CI value. Applying such an algorithm to the previous example results in the following weighted interleaving pulse map:

{3 2 2 3 2 2 3 2 2 2}.

Additional examples applying the weighted interleaving pattern and algorithm are as follows:

PC-CI=2.666 pps over 10 charge intervals yields a pulse map expression of {3, 7} {2, 3}. Applying weighted interleaving the expression expands into the following pulse map: {3, 3, 2, 3, 3, 2, 3, 3, 2, 3};

PC-CI=8.333 pps over 10 charge intervals yields a pulse map expression of {9, 3} {8, 7} with weighted interleaving expansion as {9, 8, 8, 9, 8, 8, 9, 8, 8, 8};

PC-CI=8.333 pps over 100 charge intervals yields a pulse map expression of {9, 33} {8, 67} with weighted interleaving expansion as{9, 8, 8, 9, 8, 8, 9, 8, 8, 9, 8, 8, 9, 8, 8, . . . }

PC-CI=23.333 pps over 7 charge intervals yields a pulse map expression of {24, 2} {23, 5} with weighted interleaving expansion as {23, 23, 24, 23, 23, 24, 23}.

It is possible to specify which of the three described pulse map patterns should be followed for any given application as follows:

{PC-CImax, PC-CImaxrep} {PC-CImin, PC-CIminrep} {Pulse Map Pattern}.

For example:

{3 3} {2 7} {weighted interleaving}.

In practice, media gateways may implement the weighted interleaving pattern, or other pattern, algorithm and thereby remove the need to specify the pattern as part of the media control protocol signaling describing the call tariff model. Those skilled in the art will recognize various techniques for providing different PC-CI over a given period to approximate a fractional pulse count.

Figure 4:
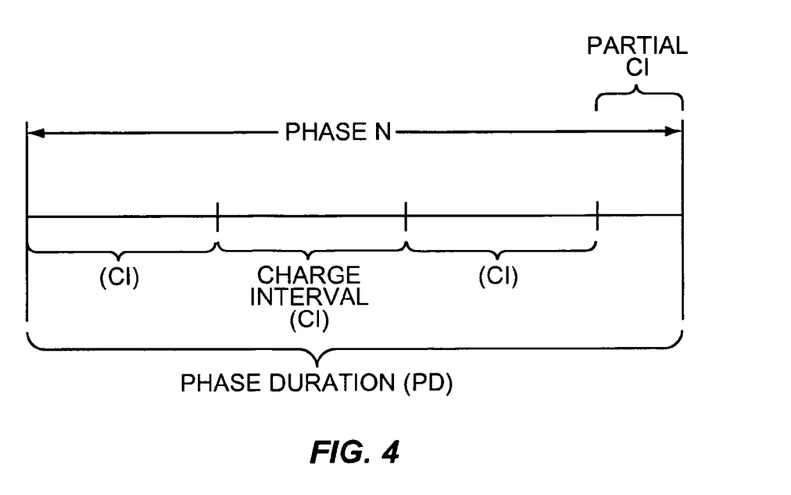
FIG. 4 illustrates a metering process wherein charge intervals do not divide evenly into a particular phase.
Figure 5:
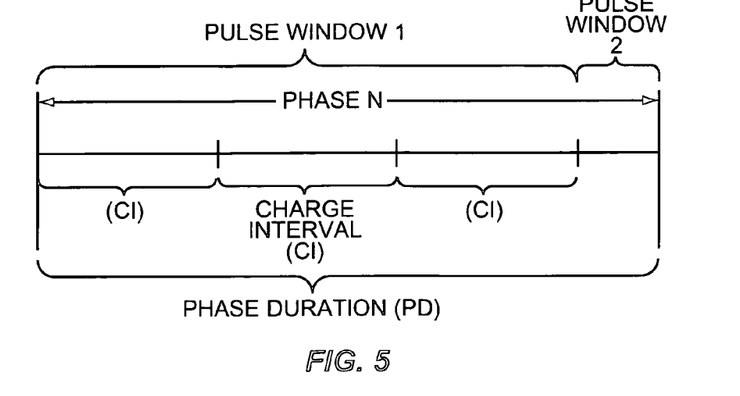
FIG. 5 illustrates the use of pulse windows to address situations wherein the charge intervals do not divide evenly into a phase according to one embodiment of the present invention.

In many instances, the charge interval does not evenly divide into the phase duration of a phase, as illustrated in FIG. 4. In essence, at the end of the phase there is a partial charge interval remaining in the phase. Depending on the desires of the service provider, there are two primary approaches to providing pulses during the partial charge interval. The first is to try to maintain the TPR as best as possible during the partial charge interval. The second is to provide pulses at the beginning of the partial charge interval as if the charge interval had a normal duration. This second approach tends to err on the side of over-pulsing. With the first method, the part of the phase for which the series of complete charge intervals may occur is defined as a first pulse window (Pulse Window 1), and the partial charge interval is defined as a second pulse window (Pulse Window 2), as illustrated in FIG. 5. For Pulse Window 1, the PC-CI is provided in a normal fashion. For example, if a fractional PC-CI were necessary, the pulse counts for the respective charge intervals would be calculated as described above for Pulse Window 1. For Pulse Window 2, the total number of pulses that should be provided during the phase, which includes Pulse Window 1 and Pulse Window 2, is determined. From this value, the number of pulses provided in Pulse Window 1 is subtracted to determine the number of pulses to provide in Pulse Window 2. If the pulse count for Pulse Window 2 is a fraction, a decision is made as to whether to round up or down to the nearest integer and then provide that number of pulses in Pulse Window 2. This method provides the most accurate pulsing throughout a given phase.

Figure 6:
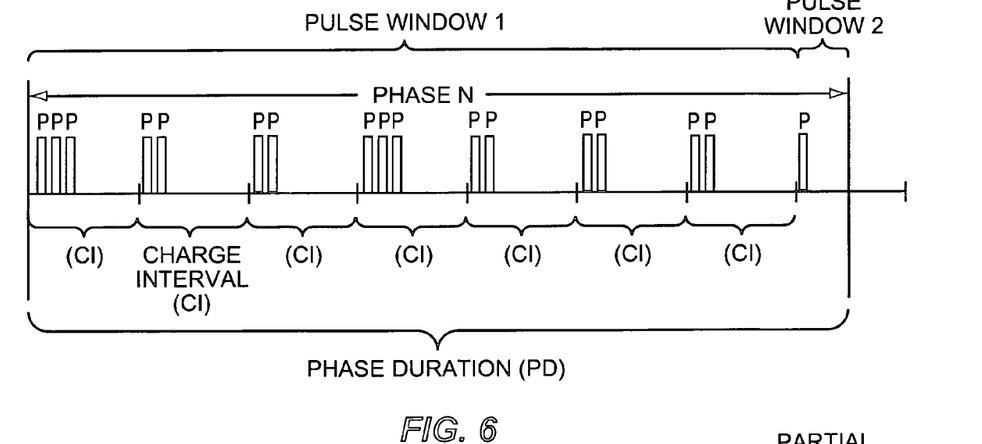
FIG. 6 illustrates the distribution of pulses for a partial charge interval when the charge intervals do not divide evenly into a phase.

With reference to FIG. 6, assume that Pulse Window 1 includes seven charge intervals, wherein a fractional pulse count of 2.333 was implemented using a charge interval expression of {3, 2} {2, 5} with a pulse map of {3, 2, 2, 3, 2, 2, 2}. Assuming that the TPR for the phase would require 16.8 pulses, Pulse Window 2 should theoretically provide 0.8 pulses, since Pulse Window 1 provided the first 16 pulses. Rounding 0.8 pulses up to one pulse, one pulse may be provided in Pulse Window 2. In this example, the entire phase is over-pulsed by 0.2 pulses, which provides a very accurate metering process.

Figure 7:
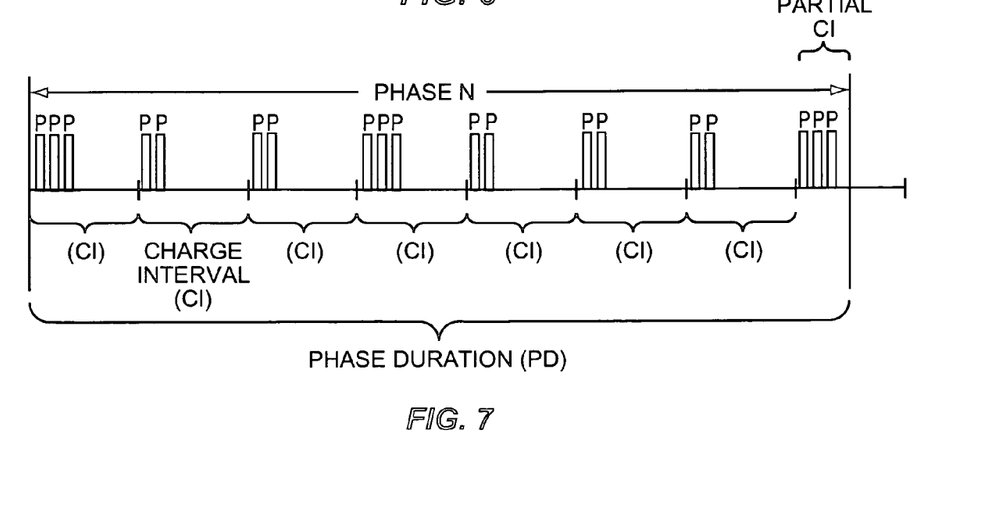
FIG. 7 illustrates the distribution of pulses in a remaining portion of a charge interval according to an alternative embodiment of the present invention.

In the second method, pulse windows are not used, and the partial charge interval is simply assigned a pulse count corresponding to one of the previous charge intervals. In one embodiment, the pulse map for a given number of charge intervals will simply repeat throughout a phase. As such, the partial charge interval will simply include either the next pulse count in the pulse map, or if the pulse map ends just prior to the partial charge interval, the partial charge interval will be assigned the pulse count associated with the first charge interval in the pulse map. With reference to FIG. 7, if the pulse map is seven charge intervals long, and the first charge interval had a pulse count of three, the partial charge interval will have a pulse count of three.

As described above, the call tariff model is provided in a single message from the media gateway controller 26 to the media gateway 22 using an appropriate media control protocol, such as H.248 or the Session Initiation Protocol, among others. The information in the message will define sufficient parameters for controlling all phases of the call, and optionally, any setup or add-on charges. The media gateway 22 may be provisioned to make certain decisions to assist in the metering process. For example, the media gateway 22 may determine the pulse map based on the charge interval expression, and as such, the media gateway controller 26 will not need to provide information on how to arrange the various pulses throughout the charge intervals, but will only need to provide information necessary to define the number of charge intervals having a first pulse count and the number of charge intervals having a second pulse count for any and all phases. Given the significant overhead associated with signaling between the media gateway controller 26 and the media gateway 22, one embodiment of the present invention attempts to minimize the amount of information necessary to define various parameters in the call tariff model as follows:

PCx=PC-CImax
PCn=PC-CImin
REPx=PC-CImaxRep
REPn=PC-CIminRep
PD=Phase Duration
CI=Charge Interval
PRI=Pulse Rate Interval
MPB=Metering Pulse Burst Based on these abbreviated parameter definitions, a phase of a call tariff model may be defined as PC-CI=3.6 pulses, CI=30 seconds, Phase Duration=1 hr, PRI max=5 pulses per second. Based on these parameters, the message provided to the media gateway 22 may be provided using the following syntax:

(PRI=5, PCX=4, REPx=6, PCn=3, REPn=4, CI=30 PD=1 hour).

From this information, the media gateway 22 can construct a pulse map and apply pulses as defined. Again, the media gateway 22 can derive the pulse map or pattern in which the various pulse counts are provided in the charge intervals. Notably, not all cases will include fractional pulse counts. As such, many cases will include a PC-CI having an integer value. In this case, PCn and REPn will be set to zero, for example, PC-CI=3 pulses, CI=30 seconds, Phase Duration=1 hour, PRI max=5 pulses, which can be sent to the media gateway 22 using the following syntax:

(PRI=5, PCx=3, REPx=10, PCn=0, REPn=0, CI=30, PD=1 hour).

Assuming the last two examples are parameters for consecutive phases in a call tariff model, the message sent to the media gateway 22 may define the call tariff model using the following syntax:

{SignalList{PRI=5, PCx=4, REPx=6, PCn=3, REPn=4, CI=30, PD=1 hr} {PRI=5, PCx=3, REPx=10, PCn=0, REPn=0, REPn=0, CI=30, PD=1 hr}}.

To minimize the size of the message sent to the media gateway 22, the above information may be reduced, using a sublist construction, as follows:

{SignalList{PRI=[5, 5], PCx=[4, 3], REPx=[6, 10], PCn=[3, 0], REPn=[4, 0], CI=[30, 30], PD= [1 hr, 1 hr]}}.

As reduced, each parameter is simply assigned consecutive values for consecutive phases. The reduction process is infinitely extensible for as many phases as are necessary to define the call tariff model. It is further noted that this sublist constructor is generally applicable to other signal lists which may be utilized within a media control protocol.

Figure 8:
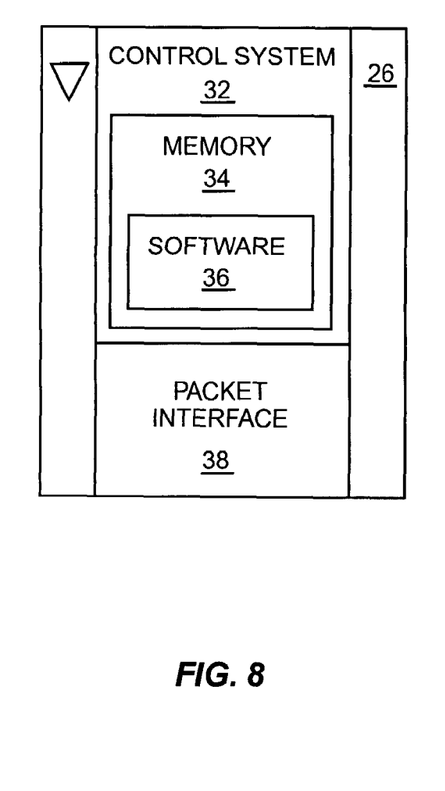
FIG. 8 is a block representation of a media gateway controller according to one embodiment of the present invention.

With reference to FIG. 8, a block representation of a media gateway controller 26 is illustrated. The media gateway controller 26 may include a control system 32 having memory 34 with sufficient software 36 to provide a call tariff model in a single message as described above. The control system 32 will include a packet interface 38 for facilitating communications with the media gateways 22 and 24, and perhaps with the signaling gateway 30.

Figure 9:
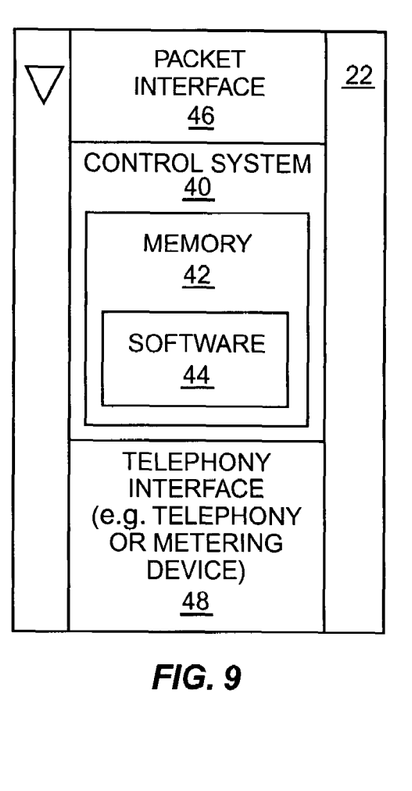
FIG. 9 is a block representation of a media gateway according to one embodiment of the present invention.

With reference to FIG. 9, a media gateway 22 is illustrated as including a control system 40 having memory 42 with sufficient software 44 to provide the metering process described above. The control system 40 will be associated with a packet interface 46 for facilitating communications over the packet network 12, as well as a telephony interface 48, which will be coupled directly or indirectly to a metering device 18, a telephony endpoint 16, or a combination thereof.

Figure 10:
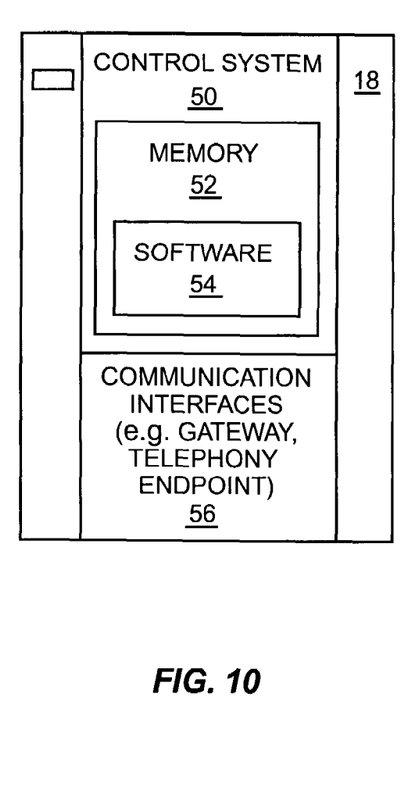
FIG. 10 is a block representation of a metering device according to one embodiment of the present invention.

A metering device 18 according to one embodiment of the present invention is illustrated in FIG. 10. The metering device 18 may include a control system 50 having memory 52 with sufficient software 54 to facilitate the metering process. The metering process may include receiving pulses from the media gateway 22, and processing these pulses as necessary to control accounting or to deliver information to the user, directly or via the telephony endpoint 16(A). The control system 50 is associated with one or more communication interfaces 56 to facilitate communications with the media gateway 22, the telephony endpoint 16(A), or a combination thereof. The software 54 may operate to provide functionality similar to that provided by the metering function 20, which is resident in the telephony endpoint 16(B).

Figure 11:
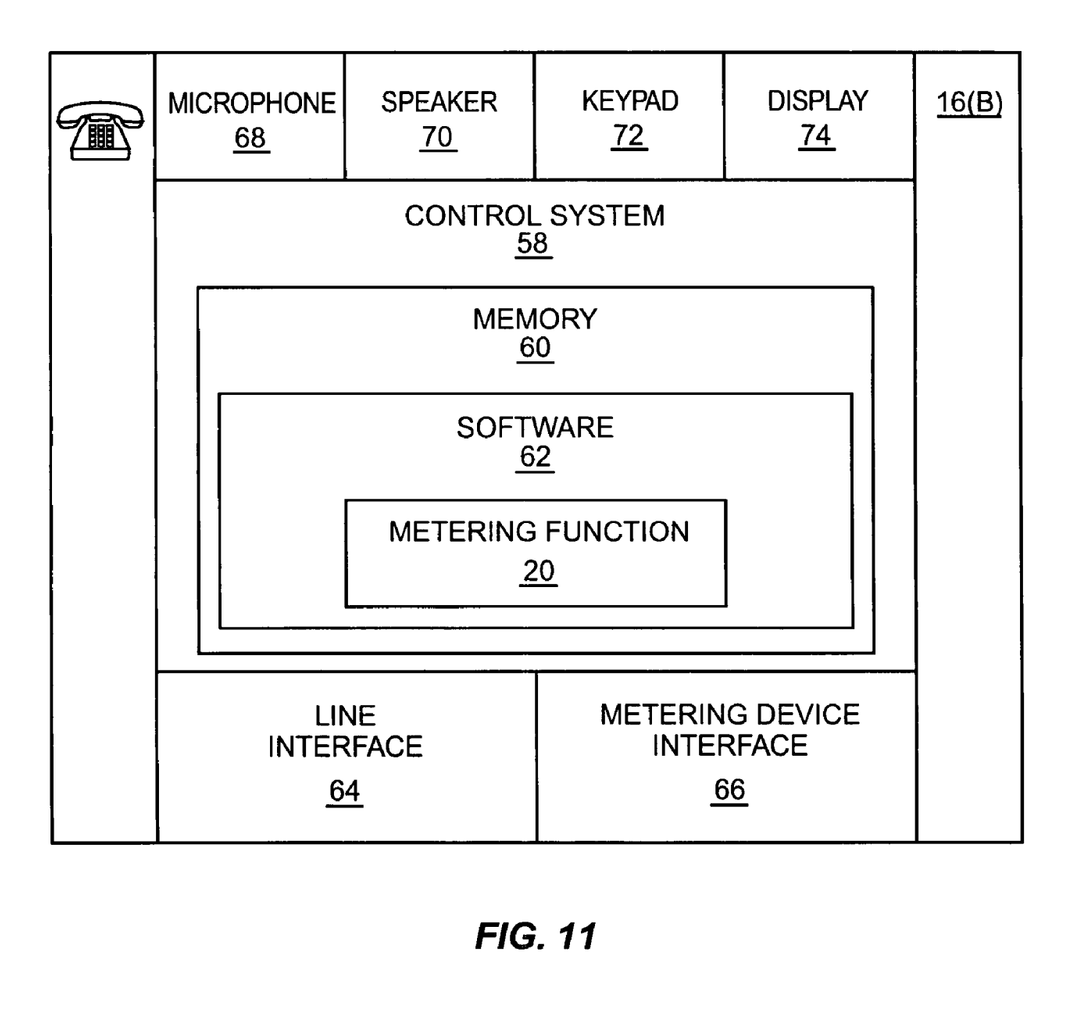
FIG. 11 is a block representation of a telephony device having a metering function according to one embodiment of the present invention.

With reference to FIG. 11, a telephony endpoint 16(B) is illustrated according to one embodiment of the present invention. The telephony endpoint 16(B) will include a control system 58 having memory 60 with sufficient software 62 to operate as described above. Preferably, the software 62 will provide the metering function 20 to support the metering process and control accounting or information delivery to the user. The control system 58 will be associated with a line interface 64, which will connect to the media gateway 22. If the metering function 20 is not provided in the telephony terminal 16(B), the control system 58 may be associated with a metering device interface 66, which may communicate with a metering device 18. In either embodiment, the control system 58 may also cooperate with a microphone 68, speaker 70, keypad 72, and display 74 to provide a user interface.

Those skilled in the art will recognize improvements and modifications to the preferred embodiments of the present invention. For example, the media gateway controller 26 and media gateway 22 may represent various types of call control entities, such as call agents and servers, terminal adaptors, and the like, taking the form of server and client or master and slave. The invention is applicable with technologies incorporating H.248, Megaco, Session Initiation Protocol, and other analogous protocols. All such improvements and modifications are considered within the scope of the concepts disclosed herein and the claims that follow.

What is claimed is:

1. A method for providing metering from a gateway in a packet network comprising:
   a) receiving a message at the gateway, the message being sent using a media control protocol, and the message comprising a complete call tariff model for controlling all metering in association with a call; and
   b) providing pulses from the gateway to a metering entity during the call according to the call tariff model.

2. The method of claim 1 wherein the call tariff model defines a plurality of phases for the call, such that each phase is associated with a different tariff rate.

3. The method of claim 2 wherein each phase is associated with tariff parameters and a phase duration.

4. The method of claim 1 wherein the call tariff model defines a number of one-time charge pulses to provide during the call for a one-time charge.

5. The method of claim 4 wherein the one-time charge is a set-up charge.

6. The method of claim 4 wherein the one-time charge is an add-on charge.

7. The method of claim 4 wherein providing the pulses comprises providing the one-time charge pulses; providing recovery pulses to compensate for normal tariff pulses that should have been provided when the one-time charge pulses are provided; and providing normal tariff pulses after the one-time charge pulses and the recovery pulses are provided.

8. The method of claim 4 wherein the call tariff model divides a phase of the call into a plurality of pulse windows, such that a first pulse window defines the number of pulses for the one-time charge and normal tariff pulses for a first portion of the phase, and a second pulse window defines the normal tariff pulses for a second portion of the phase.

9. The method of claim 8 wherein the call includes other pulse windows, which correspond to other phases.

10. The method of claim 1 wherein the call tariff model defines a fractional pulse rate to implement over a given period, which is divided into n sub-periods, by providing a maximum pulse value, minimum pulse value, maximum pulse repetition value, and minimum pulse repetition value, such that the maximum pulse value and the minimum pulse value sum to n; the maximum pulse value represents a number of pulses to provide in the maximum pulse repetition value of n sub-periods; and the minimum pulse value represents a number of pulses to provide in the minimum pulse repetition value of n sub-periods.

11. The method of claim 10 further comprising generating a pulse map corresponding to the fractional pulse rate to assign either the maximum pulse value or the minimum pulse value of pulses to each of the n sub-periods based on the minimum pulse repetition value and the maximum pulse repetition value.

12. The method of claim 10 wherein the maximum pulse repetition value of sub-periods at a beginning of the period are provided the maximum pulse value of pulses.

13. The method of claim 10 wherein the minimum pulse repetition value of sub-periods at a beginning of the period are provided the minimum pulse value of pulses.

14. The method of claim 10 wherein the maximum pulse value of pulses and the minimum pulse value of pulses are interleaved throughout the sub-periods during the period.

15. The method of claim 10 wherein when the fractional pulse rate is x.y, such that x is an integer; 0<y<10; the maximum pulse value is x+1; the minimum pulse value is x; and the maximum pulse repetition value and the minimum pulse repetition value sum to n.

16. The method of claim 10 wherein the sub-period is a charge interval.

17. The method of claim 1 wherein the call tariff model defines charge intervals and a phase that is not evenly divisible by the charge intervals, such that the phase ends with a partial charge interval, the method further comprising providing a number of pulses during the partial charge interval equal to a number of pulses provided during a charge interval.

18. The method of claim 1 wherein the call tariff model defines charge intervals and a phase that is not evenly divisible by the charge intervals, such that the phase ends with a partial charge interval, the method further comprising providing a number of pulses during the partial charge interval to approximate a tariff pulse rate for the phase.

19. The method of claim 1 wherein parameter values for a given parameter for each phase of the call tariff model are provided with a single parameter identity in the message.

20. The method of claim 1 wherein the message is received from a media gateway controller over the packet network and the pulses are provided over a telephony circuit to either a telephony endpoint having a metering function or to a metering device associated with the telephony endpoint.

21. A system for providing metering from a gateway in a packet network comprising:
  a) a packet interface to facilitate communication over a packet network;
  b) a telephony line interface to facilitate communications over a telephony line to either a telephony endpoint having a metering function or a metering device associated with the telephony endpoint; and
  c) a control system associated with the packet interface and the telephony line interface and adapted to:
    i. receive a message over the packet network at the gateway, the message being sent using a media control protocol, and the message comprising a complete call tariff model for controlling all metering in association with a call; and
    ii. provide pulses via the telephony line interface during the call according to the call tariff model.

22. The system of claim 21 wherein the call tariff model defines a plurality of phases for the call, such that each phase is associated with a different tariff rate.

23. The system of claim 22 wherein each phase is associated with tariff parameters and a phase duration.

24. The system of claim 21 wherein the call tariff model defines a number of one-time charge pulses to provide during the call for a one-time charge.

25. The system of claim 24 wherein the one-time charge is a set-up charge.

26. The system of claim 24 wherein the one-time charge is an add-on charge.

27. The system of claim 24 wherein to provide the pulses, the control system is further adapted to provide the one-time charge pulses; provide recovery pulses to compensate for normal tariff pulses that should have been provided when the one-time charge pulses are provided; and provide normal tariff pulses after the one-time charge pulses and the recovery pulses are provided.

28. The system of claim 24 wherein the call tariff model divides a phase of the call into a plurality of pulse windows, such that a first pulse window defines the number of pulses for the one-time charge and normal tariff pulses for a first portion of the phase, and a second pulse window defines the normal tariff pulses for a second portion of the phase.

29. The system of claim 28 wherein the call includes other pulse windows, which correspond to other phases.

30. The system of claim 21 wherein the call tariff model defines a fractional pulse rate to implement over a given period, which is divided into n sub-periods, by providing a maximum pulse value, minimum pulse value, maximum pulse repetition value, and minimum pulse repetition value, such that the maximum pulse value and the minimum pulse value sum to n; the maximum pulse value represents a number of pulses to provide in the maximum pulse repetition value of n sub-periods; the minimum pulse value represents a number of pulses to provide in the minimum pulse repetition value of n sub-periods.

31. The system of claim 30 wherein the control system is further adapted to generate a pulse map corresponding to the fractional pulse rate to assign either the maximum pulse value or the minimum pulse value of pulses to each of the n sub-periods based on the minimum pulse repetition value and the maximum pulse repetition value.

32. The system of claim 30 wherein the maximum pulse repetition value of sub-periods at a beginning of the period are provided the maximum pulse value of pulses.

33. The system of claim 30 wherein the minimum pulse repetition value of sub-periods at a beginning of the period are provided the minimum pulse value of pulses.

34. The system of claim 30 wherein the maximum pulse value of pulses and the minimum pulse value of pulses are interleaved throughout the sub-periods during the period.

35. The system of claim 30 wherein when the fractional pulse rate is x.y, such that x is an integer; 0<y<10; the maximum pulse value is x+1; the minimum pulse value is x; and the maximum pulse repetition value and the minimum pulse repetition value sum to n.

36. The system of claim 30 wherein the sub-period is a charge interval.

37. The system of claim 21 wherein the call tariff model defines charge intervals and a phase that is not evenly divisible by the charge intervals, such that the phase ends with a partial charge interval, wherein the control system is further adapted to provide a number of pulses during the partial charge interval equal to a number of pulses provided during a charge interval.

38. The system of claim 21 wherein the call tariff model defines charge intervals and a phase that is not evenly divisible by the charge intervals, such that the phase ends with a partial charge interval, wherein the control system is further adapted to provide a number of pulses during the partial charge interval to approximate a tariff pulse rate for the phase.

39. The system of claim 21 wherein parameter values for a given parameter for each phase of the call tariff model are provided with a single parameter identity in the message.

* * * * *